US009061449B2

United States Patent
Kurokawa

(10) Patent No.: US 9,061,449 B2
(45) Date of Patent: Jun. 23, 2015

(54) PROCESS FOR PRODUCING A FLUORORESIN SHEET CONTAINING A FILLER AND A FLUOROESIN SHEET CONTAINING A FILLER

(75) Inventor: Shinya Kurokawa, Gojo (JP)

(73) Assignee: Nippon Valqua Industries, Ltd., Tokyo (JP)

( * ) Notice: Subject to any disclaimer, the term of this patent is extended or adjusted under 35 U.S.C. 154(b) by 243 days.

(21) Appl. No.: 12/294,188

(22) PCT Filed: Mar. 19, 2007

(86) PCT No.: PCT/JP2007/055505
§ 371 (c)(1),
(2), (4) Date: Sep. 23, 2008

(87) PCT Pub. No.: WO2007/111178
PCT Pub. Date: Oct. 4, 2007

(65) Prior Publication Data
US 2009/0234061 A1    Sep. 17, 2009

(30) Foreign Application Priority Data

Mar. 24, 2006  (JP) ................................. 2006-082674

(51) Int. Cl.
| | | |
|---|---|---|
| B29C 43/00 | (2006.01) | |
| *C08J 3/205* | (2006.01) | |
| *C08J 5/18* | (2006.01) | |
| B29K 27/18 | (2006.01) | |
| B29C 43/06 | (2006.01) | |
| B29C 43/22 | (2006.01) | |
| B29C 43/24 | (2006.01) | |
| B29C 43/46 | (2006.01) | |
| B29C 47/00 | (2006.01) | |
| B29C 47/14 | (2006.01) | |
| B29C 47/20 | (2006.01) | |
| B29K 27/12 | (2006.01) | |
| B29K 27/00 | (2006.01) | |
| B29K 105/06 | (2006.01) | |
| B29K 105/16 | (2006.01) | |
| B29K 105/00 | (2006.01) | |

(52) U.S. Cl.
CPC ........... *B29C 43/003* (2013.01); *C08J 2327/18* (2013.01); *B29K 2027/18* (2013.01); *B29C 43/06* (2013.01); *B29C 43/222* (2013.01); *B29C 43/24* (2013.01); *B29C 43/46* (2013.01); *B29C 47/0021* (2013.01); *B29C 47/14* (2013.01); *B29C 47/20* (2013.01); *B29K 2027/12* (2013.01); *B29K 2027/16* (2013.01); *B29K 2105/06* (2013.01); *B29K 2105/16* (2013.01); *B29K 2105/256* (2013.01); *C08J 3/205* (2013.01); *C08J 5/18* (2013.01); *C08J 2327/12* (2013.01)

(58) Field of Classification Search
CPC ................................. C08J 3/205; B29C 43/06
USPC .................................... 524/545, 546; 264/175
See application file for complete search history.

(56) References Cited

U.S. PATENT DOCUMENTS

| | | | | |
|---|---|---|---|---|
| 2,752,637 | A * | 7/1956 | Walker et al. .................. | 264/119 |
| 3,027,601 | A * | 4/1962 | Barry ............................. | 428/338 |
| 3,315,020 | A | 4/1967 | Gore | |
| 4,049,589 | A * | 9/1977 | Sakane ........................... | 521/64 |
| 4,145,385 | A * | 3/1979 | Sako et al. ..................... | 264/469 |
| 4,208,194 | A * | 6/1980 | Nelson ............................... | 96/4 |
| 4,714,748 | A * | 12/1987 | Hoashi et al. .................. | 526/255 |
| 4,985,190 | A * | 1/1991 | Ishikawa et al. .............. | 264/122 |
| 5,045,588 | A * | 9/1991 | Arranaga ....................... | 524/445 |
| 5,519,172 | A * | 5/1996 | Spencer et al. ........... | 174/110 R |
| 6,270,707 | B1 | 8/2001 | Hori et al. | |
| 6,525,923 | B2 * | 2/2003 | Ishikawa et al. .............. | 361/508 |
| 6,620,190 | B1 * | 9/2003 | Colone .......................... | 623/1.1 |

FOREIGN PATENT DOCUMENTS

| | | | |
|---|---|---|---|
| JP | 3042223 | A | 2/1991 |
| JP | 5008317 | A | 1/1993 |
| JP | 11077787 | A | 3/1999 |
| JP | 2004323717 | A | 11/2004 |
| JP | 2007038423 | A | 2/2007 |

OTHER PUBLICATIONS

Hewitt, "Silica as a Reinforcing agent", Compounding Precipitated Silica in Elastomers, 2007, William Andrew Publishing/Plastics Design, paes 1-22.*
Hewitt, "Silica as a Reinforcing Agent", Compounding Precipitated Silica in Elastomers, 2007, William Andrew Publishing/Plastics Design, pp. 1-23.*
Ebenesajjad, S., Fluoroplastics, 2000, William Andrew Publising/ Plastics Desing Library, vol. 1, p. 153.*

* cited by examiner

*Primary Examiner* — Nicole M Buie-Hatcher
(74) *Attorney, Agent, or Firm* — The Webb Law Firm

(57) ABSTRACT

A process for producing a fluororesin sheet containing a filler includes a step of rolling a sheet-forming resin composition including a fluororesin, a filler and a processing aid at a roll temperature of from 40 to 80° C. The processing aid includes at least 30% by mass of a petroleum hydrocarbon solvent having a fractionating temperature of not higher than 120° C. based on 100% by mass of the amount of the processing aid. The fluororesin sheet so produced provides high stress relaxation properties along with high hermetic sealing properties even when the content of the fluororesin is low and the content of the filler is high.

4 Claims, No Drawings

US 9,061,449 B2

PROCESS FOR PRODUCING A FLUORORESIN SHEET CONTAINING A FILLER AND A FLUOROESIN SHEET CONTAINING A FILLER

TECHNICAL FIELD

The present invention relates to a process for producing a fluororesin sheet containing a filler and a fluororesin sheet containing a filler. More specifically, it relates to a process for producing a fluororesin sheet containing a filler, which is used as sealing materials or the like, and a fluororesin sheet containing a filler.

TECHNICAL BACKGROUND

A fluororesin sheet containing a filler is prepared by mixing a fluororesin with a filler and processing the mixture into a sheet form. As a result, the fluororesin sheet containing the filler not only has chemical resistance, heat resistance, non-adhesion properties and low friction properties, which are inherent in the fluororesin, but also has functions and properties, which are inherent in the filler. Moreover, the fluororesin sheet containing the filler is improved in wear properties and creep characteristics, which are the defects of a fluororesin. Accordingly, the fluororesin sheet containing the filler is variously used for sealing materials or the like.

Some of sealing materials are prepared by mixing a fluororesin with a metal, graphite or an inorganic filler so as to be improved in thermal conductivity, wear properties and creep characteristics. They are used as knitting yarns for sheet-like gaskets or gland packings.

U.S. Pat. No. 3,315,020 (Patent Document 1) discloses, in the specification, a technique such that a mixture of PTFE, a filler and a processing aid is extrusion molded and rolled by passing the molded mixture through a pair of pressure rolls once or several times, to prepare a long sheet. However, when the a sheet-like gasket is made from a fluororesin sheet containing a filler utilizing this technique, a gasket satisfying the properties as a sealing material cannot be prepared because the hermetical properties are low although the stress relaxation properties tend to be excellent if the filler content is high.

JP-A-2004-323717 (Patent Document 2) discloses a fluororesin sheet containing a filler prepared in such a way that a composition, which contains a fluororesin, a swelling mineral, a filler and a processing aid, is extrusion molded and thereafter stretched to be made into a sheet by passing the composition through a pressure roll. This fluororesin sheet containing the filler has excellent stress relaxation properties and tensile strength even if the fluororesin content is low and the filler content is high in the sheet.

It is found that the fluororesin sheet containing a filler disclosed in Patent Document 2 still has room for improvement in sealing properties because the amount of the fluororesin, which is used as a binder for filling the spaces between hard particulate inorganic fillers, is insufficient.

The present invention has been accomplished with the view of solving the problems as described above. It is an object of the invention to provide a fluororesin sheet containing a filler having both of high stress relaxation properties and high hermetic properties (sealing properties) even if having a low fluororesin content and a high filler content, and it is another object of the invention to provide a production process of the sheet.

SUMMARY OF THE INVENTION

The present inventors have been earnestly studied and found that a fluororesin sheet containing a filler having both of high stress relaxation properties and high hermetic properties can be prepared by gradually evaporating a processing aid in the process of production of a fluororesin sheet containing a filler. Thus, the present invention has been accomplished.

The process for producing a fluororesin sheet containing a filler according to the present invention comprises a step of rolling a sheet-forming resin composition comprising a fluororesin, a filler and a processing aid at a roll temperature of from 40 to 80° C., wherein the processing aid comprises at least 30% by mass of a petroleum hydrocarbon solvent having a fractionating temperature of not higher than 120° C. based on 100% by mass of the amount of the processing aid.

The mass ratio of the fluororesin to the filler in the composition is preferably 1:0.1 to 2.

The composition preferably contains the processing aid in an amount of from 5 to 50 parts by weight based on 100 parts by weight of the total amount of the fluororesin and the filler.

The process for producing a fluororesin sheet containing a filler according to the present invention further comprises a step of rolling a resulting rolled sheet prepared in the previous rolling step.

The fluororesin sheet containing a filler of the present invention is formed by the above process for producing the fluororesin sheet containing the filler according to the present invention.

The production process of the present invention can prepare a fluororesin sheet containing a filler having both of high stress relaxation properties and high hermetic properties though the content of the fluororesin is low and the content of the filler is high.

DETAILED DESCRIPTION OF THE INVENTION

The process for producing a fluororesin sheet containing a filler according to the present invention comprises a step of rolling a sheet-forming resin composition comprising a fluororesin, a filler and a processing aid at a roll temperature of from 40 to 80° C., wherein the processing aid comprises at least 30% by mass of a petroleum hydrocarbon solvent having a fractionating temperature of not higher than 120° C. based on 100% by mass of the amount of the processing aid.

Resin Composition for Sheet-Forming
Fluororesin

Any one of conventionally known fluororesins can be preferably used as the fluororesin. Examples thereof are polytetrafluoroethylene resin (PTFE), and also modified PTFE, polyvinylidene fluoride resin (PVDF), ethylene-tetrafluoroethylene copolymer resin (ETFE), polychlorotrifluoroethylene resin (PCTFE), ethylene-tetrafluoroethylene-hexafluoropropylene copolymer resin (FEP) and tetrafluoroethylene-perfluoroalkyl copolymer resin. Among them, it is preferred to use PTFE prepared by emulsion polymerization in viewpoint of processing properties in carrying out extrusion molding and rolling.

As the fluororesin, a powdery one may be used or a dispersion prepared by dispersing fluororesin fine particles in water may be used. In the case of using the dispersion as the fluororesin, the composition for forming the fluororesin sheet containing a filler can be prepared only by adding an appropriate amount of water, the filler, the processing aid, and the like to the fluororesin dispersion and stirring. Furthermore, using the composition, the fluororesin sheet containing a filler can be prepared efficiently.

Filler

Examples of the filler used in the invention may include carbon fillers such as graphite, carbon black, expansive graphite, activated carbon and carbon nanotube; inorganic fillers such as talc, mica, clay, calcium carbonate and magnesium oxide; and powdery resins such as PPS and the like. Furthermore, fibrous materials having a fiber length of less than 10 mm, made from carbon fiber, aramid fiber, rock wool, or the like may be used as the filler.

According to the present invention, even if the proportion of fluororesin fed is low and the proportion of the filler fed is high, a fluororesin sheet containing a filler having both of high stress relaxation properties and high hermetic properties can be produced. The mass ratio of the fluororesin to the filler may be 1:0.1 to 2, preferably 1:1 to 1.8.

Processing Aid

The composition for forming the fluororesin sheet contains a processing aid.

The processing aid used in the present invention comprises a petroleum hydrocarbon solvent having a fractional temperature of lower than 120° C., preferably lower than 110° C. in an amount of at least 30% by mass, preferably at least 50% by mass based on 100% by mass of the amount of the processing aids, and particularly preferably it essentially comprises a petroleum hydrocarbon solvent having a fractional temperature of lower than 120° C. The lower limit of the fractional temperature is not particularly defined. However, when the fractional temperature is too low, the processing aid is evaporated quickly to excess in the rolling step and thereby it is occasionally difficult to evaporate and remove the processing aid gradually. Therefore, the lower limit of the fractional temperature may be about 80° C.

Typical examples of the petroleum hydrocarbon solvents having a fractional temperature of lower than 120° C. include paraffin solvents, such as commercially available ISOPER C (hydrocarbon organic solvent, fractional temperature of 97 to 104° C., manufactured by Exxon Mobil Co.).

In a conventional production process for a fluororesin sheet containing a filler, it is general to use a petroleum hydrocarbon solvent having a high fractional temperature of from 180 to 250° C. as a processing aid. The processing aid is multi-purpose in viewpoint of carrying out rolling operation stably without evaporating solvents, but in a rolling step described later, the solvents are hardly evaporated even if increasing the roll temperature.

Components, which may be contained in the processing aid, other than the petroleum hydrocarbon solvent having a fractional temperature of lower than 120° C., may be petroleum hydrocarbon solvents having a fractional temperature of higher than 120° C., such as commercially available ISOPER G (hydrocarbon organic solvent, fractional temperature of 158 to 175° C., manufactured by Exxon Mobil Co.).

In the sheet-forming resin composition, the processing aid is contained in an amount of 5 to 50 parts by weight, preferably 10 to 30 parts by weight based on 100 parts by weight of the total of the fluororesin and the filler.

When the processing aid is contained in the above amounts, the fluororesin is sufficiently swelled in the former part of the rolling step described later.

The sheet-forming resin composition essentially comprises the fluororesin, the filler and the processing aid.

For preparing the fluororesin sheet-forming resin composition containing these components, the components are added in an arbitrary order at once or dividedly by small amounts several times to a vessel, and mixed with stirring.

Process for Producing Fluororesin Sheet

A process for producing the fluororesin sheet containing a filler generally comprises a stirring step, a pre-molding step, a rolling step, a drying step and a calcining step in this order.

<Stirring Step>

In the stirring step, the fluororesin, the filler and the processing aid are mixed in an arbitrary order and stirred as described above. When the stirring efficiency is insufficient, a large amount of the processing aid is added and after the stirring, excess amounts of the processing aid can be removed with filtration.

<Pre-Molding Step>

In the pre-molding step, the fluororesin sheet-forming resin composition is extrusion molded to prepare a preform (extrusion molded product).

The shape of the extrusion-molded product (preform) is not particularly limited, but the preform preferably has a rod or ribbon-like shape in considering of the efficiency of the following forming the sheet and the homogeneity of the sheet properties.

In the production process of the present invention, the processing aid is gradually evaporated in the following rolling step. Accordingly, the mixing step and pre-molding step are preferably carried out at a temperature lower than the roll temperature in the rolling step in order to prevent the processing aid from evaporating.

<Rolling Step>

In the rolling step succeeded to the pre-molding step, the preform is passed through pressure rolls such as a biaxial roll to roll and shape into a sheet. In the prior art, the rolling step is carried out without heating, specifically at room temperature of about from 10 to 30° C., and the petroleum hydrocarbon solvents having a high fractional temperature of from 180 to 250° C. are generally used as a processing aid. Accordingly, during the rolling step, the processing aid is hardly evaporated.

The processing aid is used in order to swell the fluororesin and to be easily fiberized. In the stirring, pre-molding and rolling steps, the fluororesin is partly fiberized by the compression stress and shear force applied on the sheet-forming resin composition. As a result, to the fluororesin sheet, sheet strength and stress relaxation are given due to the matrix complexation. However, it is considered that this sheet is soft and easily deformed, so that even if the sheet is compressed by a biaxial roll or the like, deformation in a plane direction is caused preferentially in the fluororesin which is swelled inside the fluororesin sheet to be rolled, and thereby densification of the inside of the sheet is hardly caused. In this case, the densification of the sheet inside means that voids of the composition inside caused by evaporation of the solvent are filled by rolling.

In the production process of the present invention, the rolling step is carried out at a roll temperature of from 40 to 80° C. using the processing aid containing a large amount of a petroleum hydrocarbon solvent having a low fractional temperature of not higher than 120° C. Therefore, during carrying out rolling with a biaxial roll or the like, the processing aid in the sheet-forming resin composition (preform) is gradually evaporated and removed. Accordingly, it is considered that at the former part of the rolling step, the fluororesin can be swelled and fiberized because a large amount of the processing aid is present. Moreover, at the later part of the rolling step, the processing aid is remained in a small amount. Accordingly, it is considered that new voids are formed in a small amount by evaporation of the processing aid in the inside of the sheet and thereby the densification of the inside of the sheet can be advanced prior to deformation in a plane direction.

Since the pressure rolling is carried out at a relatively high temperature, the hardness of the fluororesin is little lowered and thereby the densification of the fluororesin sheet is more easily performed.

When the rolling step is carried out at a temperature lower than 40° C., the processing aid tends to hardly evaporate. On the other hand, when the rolling step is carried out at a temperature over 80° C., the processing aid evaporates excessively, and thereby the amount of the processing aid remained is low at the former part of the rolling step. Therefore, the fluororesin cannot be sufficiently swelled and fiberized, resulted in a tendency of lowering the strength of a resulting fluororesin sheet containing the filler. Furthermore, when the processing aid in the composition vaporizes rapidly, a swelling phenomenon is caused and the hermetic properties of the fluororesin sheet containing the filler tend to be lowered.

The production process of the present invention preferably comprises a rolling step of further rolling the rolled sheet prepared in the previous rolling step. That is to say, the rolling step is preferably repeated several times. By repeating the rolling step, the inside of the fluororesin sheet can be further densified. When the rolling step is repeated, the distance between rolls is made to be narrower as the rolling is repeated.

In forming the sheet by rolling the preform with the biaxial roll, the distance between rolls is set to be from 0.5 to 20 mm and the preform is rolled at a roll surface velocity (sheet extrusion rate) of from 5 to 50 mm/sec.

<Drying Step>

In the drying step, the rolled sheet is allowed to stand at ordinary temperature, or heated at a temperature lower than the boiling point of the fluororesin and thereby the processing aid is removed.

<Calcining Step>

In the calcining step, the dried sheet is heated at a temperature higher than the melting point of the fluororesin to be calcined. The heating temperature, which is somewhat varied by the kinds of the fluororesins, is preferably about from 340 to 370° C. in considering the necessity of calcining the whole sheet uniformly and the generation of a poisonous fluorinated gas at excessively high temperatures.

Fluororesin Sheet Containing a Filler

By the production process of the present invention, the fluororesin sheet containing the filler is prepared. The fluororesin sheet containing the filler has high stress relaxation properties and high hermetic properties both, a tensile strength, determined by JIS R3453, of at least 8 MPa, preferably at least 10 MPa, and a leaked amount, determined by the hermetic test, of lower than $9\times10^{-5}$ Pa·m$^3$/s, preferably lower than $7\times10^{-5}$ Pa·m$^3$/s. The hermetic test is carried out using a gasket test piece having $\phi$ 48 mm×$\phi$ 67 mm×1.5 mm thick, at a surface pressure of 19.6 MPa (200 kgf/cm$^2$G) and a nitrogen gas internal pressure of 0.98 MPa (1.0 kgf/cm$^2$G).

EXAMPLE

The production process of the present invention will be described in more detail with reference to the following examples, but it is not limited by the examples.

<Testing Method>

A test piece was prepared from a sheet having a thickness of 1.5 mm and the hermetic properties and the tensile strength thereof were measured.

Leaked Amount (Hermetic Properties)

A gasket test piece having $\phi$ 48 mm×$\phi$ 67 mm was punched out and set between steel flanges having $\phi$ 100 mm×50 mm height and a surface roughness Rmax of 12 μm. A load was applied by a compression testing machine so that the test piece had a surface pressure 19.6 MPa (200 kgf/cm$^2$G). A nitrogen gas internal pressure of 0.98 MPa (1.0 kgf/cm$^2$G) was loaded from a through hole for pressure introduction provided on the flanges to the internal diameter side of the gasket. Thereafter, a pressure introducing tube was closed and this state was maintained for 1 hour. The change in pressure before and after the maintaining was read out using a pressure sensor, and thereby the leaked amount was determined from the drop in pressure.

Tensile Strength

A test piece was prepared in accordance with JIS R3453 and the tensile strength was measured.

Example 1

Using a kneader, 400 g of PTFE fine powder (CD-1 manufactured by Asahi Glass Co.), 600 g of NK-300 (fine powder clay manufactured by Showa KDE Co.) and 250 g of ISOPER C (hydrocarbon type organic solvent, fractional temperature of from 97 to 104° C. manufactured by Exxon Mobil Co.) were mixed for 5 minutes and allowed to stand at room temperature (25° C.) for 16 hours for aging, to prepare a sheet-forming composition.

The composition was extruded at room temperature (25° C.) by an extruder having an opening of 300 mm×200 mm, to form a preform.

The preform was rolled by a biaxial roll under conditions such that the roll diameter was 700 mm, the distance between rolls was 20 mm, the roll rate was 6 m/min and the roll temperature was 40° C. Just after this rolling, a resulting sheet was rolled again at a distance between rolls of 10 mm. Furthermore, just after the rolling, a resulting sheet was rolled at a distance between rolls of 5 mm again. Finally, just after the rolling, a resulting sheet was rolled at a distance between rolls of 1.5 mm to prepare a sheet having a thickness of 1.5 mm.

The sheet was allowed to stand at room temperature (25° C.) for 24 hours to remove the solvent. Thereafter, the sheet was calcined at 350° C. by an electric furnace for 3 hours, to prepare a sheet gasket.

The sheet gasket had a leaked amount (hermetic properties) of $4.0 \times 10^{-5}$ Pa·m$^3$/s and a tensile strength of 11 MPa.

Example 2

The procedure of Example 1 was repeated except for using 125 g of ISOPER C hydrocarbon type organic solvent and 125 g of ISOPER G (hydrocarbon type organic solvent, a fractional temperature of from 158 to 175° C. manufactured by Exxon Mobil Co.) in place of 250 g of ISOPER C hydrocarbon type organic solvent, to prepare a sheet gasket.

The sheet gasket had a leaked amount (hermetic properties) of $6.0 \times 10^{-5}$ Pa·m$^3$/s and a tensile strength of 10 MPa.

Example 3

The procedure of Example 2 was repeated except for changing the roll temperature to 80° C. from 40° C., to prepare a sheet gasket.

The sheet gasket had a leaked amount (hermetic properties) of $4.0 \times 10^{-5}$ Pa·m$^3$/s and a tensile strength of 11 MPa.

Comparative Example 1

The procedure of Example 1 was repeated except for using 250 g of ISOPER G hydrocarbon type organic solvent in place of 250 g of ISOPER C hydrocarbon type organic solvent, and changing the roll temperature to 80° C. from 40° C., to prepare a sheet gasket.

The sheet gasket had a leaked amount (hermetic properties) of $1.0 \times 10^{-4}$ Pa·m$^3$/s and a tensile strength of 11 MPa.

Comparative Example 2

The procedure of Example 1 was repeated except for using 250 g of ISOPER G hydrocarbon type organic solvent in place of 250 g of ISOPER C hydrocarbon type organic solvent, to prepare a sheet gasket.

The sheet gasket had a leaked amount (hermetic properties) of $2.0 \times 10^{-4}$ Pa·m$^3$/s and a tensile strength of 10 MPa.

Comparative Example 3

The procedure of Example 1 was repeated except for using 250 g of ISOPER M hydrocarbon type organic solvent (hydrocarbon type organic solvent, a fractional temperature of from 218 to 253° C. manufactured by Exxon Mobil Co.) in place of 250 g of ISOPER C hydrocarbon type organic solvent, and changing the roll temperature to 80° C. from 40° C., to prepare a sheet gasket.

The sheet gasket had a leaked amount (hermetic properties) of $8.0 \times 10^{-4}$ Pa·m$^3$/s and a tensile strength of 10 MPa.

Comparative Example 4

The procedure of Example 1 was repeated except for changing the roll temperature to 25° C. from 40° C., to prepare a sheet gasket.

The sheet gasket had a leaked amount (hermetic properties) of $4.0 \times 10^{-4}$ Pa·m$^3$/s and a tensile strength of 10 MPa.

Comparative Example 5

The procedure of Example 1 was repeated except for changing the roll temperature to 100° C. from 40° C., to prepare a sheet gasket.

The sheet gasket had a leaked amount (hermetic properties) of $1.0 \times 10^{-3}$ Pa·m$^3$/s and a tensile strength of 6 MPa.

TABLE 1

| Item | | Unit | Example | | | Comparative Example | | | | |
|---|---|---|---|---|---|---|---|---|---|---|
| | | | 1 | 2 | 3 | 1 | 2 | 3 | 4 | 5 |
| PTFE | CD-1 | g | 400 | 400 | 400 | 400 | 400 | 400 | 400 | 400 |
| Inorganic filler | NK-300 | g | 600 | 600 | 600 | 600 | 600 | 600 | 600 | 600 |
| Aid | Isoper C* | g | 250 | 125 | 125 | | | | 250 | 250 |
| | Isoper G* | g | | 125 | 125 | 250 | 250 | | | |
| | Isoper M* | g | | | | | | 250 | | |
| Rolling temperature | | °C. | 40 | 40 | 80 | 80 | 40 | 80 | 25 | 100 |
| Thickness | | mm | 1.5 | 1.5 | 1.5 | 1.5 | 1.5 | 1.5 | 1.5 | 1.5 |
| Hermetic test (σ 19.6 MPa, P 0.98 MPa, φ48 × φ67 × t1.5 mm paste non-coated) | | Pa·m$^3$/s | 4.0E−05 | 6.0E−05 | 4.0E−05 | 1.0E−04 | 2.0E−04 | 8.0E−04 | 4.0E−04 | 1.0E−03 |
| Tensile strength (JIS R3453) | | MPa | 11 | 10 | 11 | 11 | 10 | 10 | 10 | 6 |

*hydrocarbon type organic solvent.

The invention claimed is:

1. A process for producing a fluororesin sheet containing a filler which process comprises, in the following order,
    a stirring step comprising stirring a fluororesin, a filler, and a processing aid thereby preparing a fluororesin sheet-forming resin composition comprising said fluororesin, said filler, and said processing aid,
    a pre-molding step for preparing a preform by extrusion molding of the fluororesin sheet-forming resin composition,
    a rolling step comprising rolling and shaping the preform into a sheet at a roll temperature of from 40 to 80° C. with the processing aid in the sheet-forming resin composition being gradually evaporated and removed,
    a drying step, and
    a calcining step, wherein for the fluororesin sheet-forming resin composition,
the processing aid comprises at least 50% by mass of a petroleum hydrocarbon solvent having a fractional temperature of lower than 120° C. based on 100% by mass of the amount of the processing aid,
the fluororesin is polytetrafluoroethylene resin,
the sheet-forming resin composition has a mass ratio of the fluororesin to the filler of 1:1 to 1:1.8, and
the sheet-forming resin composition contains the processing aid in an amount of from 5 to 50 parts by weight based on 100 parts by weight of the total amount of the fluororesin and the filler, and
wherein the pre-molding step is carried out at a temperature lower than the roll temperature in the rolling step.

2. The process for producing a fluororesin sheet containing a filler according to claim 1 which process further comprises a step of rolling a resulting pressure rolled sheet prepared in the preceding rolling step.

3. The process for producing a fluororesin sheet containing a filler according to claim 1, wherein a lower limit of the fractional temperature of the petroleum hydrocarbon solvent is not less than 80° C.

4. The process for producing a fluororesin sheet containing a filler according to claim 1, wherein the drying step comprises standing the rolled sheet at ordinary temperature.

* * * * *

UNITED STATES PATENT AND TRADEMARK OFFICE
CERTIFICATE OF CORRECTION

PATENT NO. : 9,061,449 B2  
APPLICATION NO. : 12/294188  
DATED : June 23, 2015  
INVENTOR(S) : Shinya Kurokawa Page 1 of 1

It is certified that error appears in the above-identified patent and that said Letters Patent is hereby corrected as shown below:

Title Page

Column 1, Item (54) Title, Line 3, delete "fluoroesin" and insert -- fluororesin --

Column 2, Item (56) OTHER PUBLICATIONS, Line 3, delete "paes" and insert -- pages --

Column 2, Item (56) OTHER PUBLICATIONS, Line 7, delete "Publising/" and insert -- Publishing/ --

Column 2, Item (56) OTHER PUBLICATIONS, Line 8, delete "Desing" and insert -- Design --

In the Specification

Column 1, Line 3, delete "fluoroesin" and insert -- fluororesin --

Signed and Sealed this  
Nineteenth Day of July, 2016

Michelle K. Lee  
*Director of the United States Patent and Trademark Office*